United States Patent
Mast et al.

(10) Patent No.: US 10,059,482 B2
(45) Date of Patent: Aug. 28, 2018

(54) TWO-STAGE CONTAINER BASE

(71) Applicant: AMCOR LIMITED, Hawthorn, Victoria (AU)

(72) Inventors: Luke A. Mast, Brooklyn, MI (US); Richard Steih, Jackson, MI (US); Kirk Edward Maki, Tecumseh, MI (US); Omkar Dole, Ann Arbor, MI (US); Mark Woloszyk, Chelsea, MI (US); David Downing, Manchester, MI (US)

(73) Assignee: Amcor Limited, Hawthorn, Victoria (AU)

( * ) Notice: Subject to any disclaimer, the term of this patent is extended or adjusted under 35 U.S.C. 154(b) by 0 days.

(21) Appl. No.: 15/505,517

(22) PCT Filed: Aug. 20, 2015

(86) PCT No.: PCT/US2015/046110
§ 371 (c)(1),
(2) Date: Feb. 21, 2017

(87) PCT Pub. No.: WO2016/029016
PCT Pub. Date: Feb. 25, 2016

(65) Prior Publication Data
US 2017/0267391 A1 Sep. 21, 2017

Related U.S. Application Data

(60) Provisional application No. 62/138,190, filed on Mar. 25, 2015, provisional application No. 62/040,277, filed on Aug. 21, 2014.

(51) Int. Cl.
*B65D 1/02* (2006.01)
*B65D 79/00* (2006.01)
(Continued)

(52) U.S. Cl.
CPC ............ *B65D 1/0276* (2013.01); *B29C 49/12* (2013.01); *B29C 49/46* (2013.01); *B65D 79/005* (2013.01);
(Continued)

(58) Field of Classification Search
CPC ....... B65B 7/2892; B65B 7/28; B65D 1/0276; B65D 1/0261; B65D 79/005; B65D 23/001; B65D 23/00; B29C 49/12; B29C 49/46
(Continued)

(56) References Cited

U.S. PATENT DOCUMENTS 2,339,763 A * 1/1944 Calleson .................. B65D 7/00
220/604
3,409,167 A * 11/1968 Lewis .................. B65D 79/005
220/609

(Continued)

FOREIGN PATENT DOCUMENTS

CA 2499928 A1 * 4/2004 .......... B65D 1/0276
JP S5717730 A 1/1982
(Continued)

OTHER PUBLICATIONS

International Search Report and Written Opinion of the ISA for PCT/US2015/046110, dated Nov. 10, 2015; ISA/KR.
(Continued)

*Primary Examiner* — Robert J Hicks
(74) *Attorney, Agent, or Firm* — Harness, Dickey & Pierce, P.L.C.

(57) ABSTRACT

A blow-molded container including a finish and a base. The finish defines an opening at a first end of the container that provides access to an internal volume. The base includes a diaphragm and a standing surface. The diaphragm extends radially outward from a central push-up portion. The stand-
(Continued)

ing surface of the container is at a second end of the container. In response to an internal vacuum caused by hot-filling and closing the container, the diaphragm is configured to move passively from an as-blown first configuration to a second configuration in which the diaphragm is closer to the first end of the container as compared to the as-blown first configuration. The diaphragm is configured to move from the second configuration to an activated third configuration in which the diaphragm is closer to the first end of the container in response to the diaphragm being externally actuated by a tool.

23 Claims, 10 Drawing Sheets (51) Int. Cl.
*B29C 49/12* (2006.01)
*B29C 49/46* (2006.01)
*B65D 23/00* (2006.01)
*B29K 101/12* (2006.01)
*B29K 105/00* (2006.01)
*B29L 31/00* (2006.01)

(52) U.S. Cl.
CPC .......... *B29C 2049/4652* (2013.01); *B29C 2049/4664* (2013.01); *B29K 2101/12* (2013.01); *B29K 2105/258* (2013.01); *B29L 2031/7158* (2013.01); *B65D 23/00* (2013.01)

(58) Field of Classification Search
USPC .......... 215/373, 372, 371, 370, 376, 44, 43; 220/624, 623, 609, 608, 604, 610; 53/471, 467, 490, 486, 485, 484, 476; D9/520
See application file for complete search history.

(56) References Cited

U.S. PATENT DOCUMENTS

| | | | | |
|---|---|---|---|---|
| 3,870,181 A * | 3/1975 | Sincock | .................. | B29C 49/12 215/373 |
| 4,082,200 A | 4/1978 | Guest et al. | | |
| 4,108,324 A * | 8/1978 | Krishnakumar | ..... | B65D 1/0276 215/373 |
| 4,331,246 A * | 5/1982 | Sorensen | ............ | B65D 23/001 215/372 |
| 4,342,398 A * | 8/1982 | Chang | .................. | B65D 1/0276 215/373 |
| 4,598,831 A * | 7/1986 | Nakamura | ........... | B65D 1/0276 215/373 |
| 4,836,398 A * | 6/1989 | Leftault, Jr. | ......... | B65D 79/005 220/609 |
| 4,863,046 A | 9/1989 | Collette et al. | | |
| 4,993,566 A * | 2/1991 | Eberle | ..................... | B29C 49/48 215/373 |
| 4,993,567 A * | 2/1991 | Eberle, Jr. | ............... | B29C 49/48 215/373 |
| 5,141,121 A * | 8/1992 | Brown | ................. | B65D 1/0223 215/381 |
| 5,503,283 A * | 4/1996 | Semersky | ........... | B65D 1/0276 215/375 |
| 5,642,826 A * | 7/1997 | Melrose | ............... | B65D 1/0292 215/382 |
| 6,299,007 B1 | 10/2001 | Takeuchi | | |
| 2003/0196926 A1 * | 10/2003 | Tobias | ................. | B65D 1/0284 206/509 |
| 2005/0017013 A1 | 1/2005 | Peisach et al. | | |
| 2008/0047964 A1 | 2/2008 | Denner et al. | | |
| 2008/0257856 A1 | 10/2008 | Melrose et al. | | |
| 2011/0017700 A1 | 1/2011 | Patcheak et al. | | |
| 2012/0037645 A1 * | 2/2012 | Boukobza | ........... | B65D 1/0276 220/600 |
| 2012/0181246 A1 | 7/2012 | Ross et al. | | |
| 2013/0001235 A1 | 1/2013 | Patcheak et al. | | |
| 2013/0087954 A1 | 4/2013 | Tsuchiya | | |
| 2013/0206719 A1 * | 8/2013 | Tanaka | ................... | B65D 90/36 215/381 |
| 2013/0220968 A1 * | 8/2013 | Imai | ..................... | B65D 1/0261 215/371 |
| 2013/0240477 A1 | 9/2013 | Saito et al. | | |
| 2013/0248539 A1 | 9/2013 | Schneider et al. | | |
| 2013/0312368 A1 | 11/2013 | Denner et al. | | |
| 2014/0069937 A1 | 3/2014 | Melrose et al. | | |
| 2014/0109517 A1 | 4/2014 | Melrose | | |
| 2015/0008210 A1 | 1/2015 | Oshino et al. | | |

FOREIGN PATENT DOCUMENTS

| | | |
|---|---|---|
| JP | 2000128140 A | 5/2000 |
| JP | 2008024314 A | 2/2008 |
| JP | 2013154907 A | 8/2013 |
| WO | WO-2006034231 A1 | 3/2006 |

OTHER PUBLICATIONS

International Search Report and Written Opinion of the ISA for PCT/US2014/052148, dated May 19, 2015; ISA/KR.
International Search Report and Written Opinion of the ISA for PCT/US2015/046123, dated Nov. 24, 2015; ISA/KR.
Supplementary European Search Report issued in European Patent Application No. 15833820.2 dated Feb. 20, 2018 which corresponds to co-pending U.S. Appl. No. 15/505,525.
Supplementary European Search Report issued in corresponding European Patent Application No. 15833351.8 dated Feb. 21, 2018.

* cited by examiner

| Size | h | Diaphragm Dia | DD/h | |
|---|---|---|---|---|
| 20 FL OZ | 14.42 | 66.67 | 4.62 | |
| 20 FL OZ | 11.79 | 67.22 | 5.70 | |
| 28/32 FL OZ | 13.62 | 80.50 | 5.91 | |
| 12 FL OZ | 8.53 | 52.68 | 6.18 | |
| 20 FL OZ | 10.80 | 67.22 | 6.22 | |
| 20 FL OZ | 10.60 | 67.22 | 6.34 | |
| 20 FL OZ | 10.59 | 67.22 | 6.35 | |
| 20 FL OZ | 10.59 | 67.22 | 6.35 | Optimum Ratio Range for Stage 1 Vacuum Absorbtion |
| 20 FL OZ | 10.59 | 67.22 | 6.35 | |
| 20 FL OZ | 10.59 | 67.22 | 6.35 | |
| 20 FL OZ | 10.58 | 67.22 | 6.35 | |
| 20 FL OZ | 10.48 | 67.22 | 6.41 | |
| 28/32 FL OZ | 12.39 | 80.50 | 6.50 | |
| 20 FL OZ | 10.20 | 67.22 | 6.59 | |
| 20 FL OZ | 9.81 | 67.22 | 6.85 | |
| 20 FL OZ | 9.60 | 67.22 | 7.00 | |
| 20 FL OZ | 9.60 | 67.22 | 7.00 | |
| 20 FL OZ | 9.60 | 67.22 | 7.00 | |
| 20 FL OZ | 9.60 | 67.22 | 7.00 | |
| 20 FL OZ | 9.00 | 64.00 | 7.11 | |
| 20 FL OZ | 9.00 | 64.00 | 7.11 | |
| 20 FL OZ | 9.00 | 64.00 | 7.11 | |
| 20 FL OZ | 8.00 | 67.22 | 8.40 | |

FIG - 11

TWO-STAGE CONTAINER BASE

CROSS-REFERENCE TO RELATED APPLICATIONS

This application is a U.S. National Phase Application under 35 U.S.C. 371 of International Application No. PCT/US2015/046110, filed on Aug. 20, 2015 and published in English as WO 2016/029016 A1 on Feb. 25, 2016. This application claims the benefit of U.S. Provisional Patent Application No. 62/138,190 (filed on Mar. 25, 2015) and U.S. Provisional Patent Application No. 62/040,277 (filed on Aug. 21, 2014), the entire disclosures of all of which are incorporated herein by reference.

FIELD

The present disclosure relates to a two-stage container base.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current containers are suitable for their intended use, they are subject to improvement. For example, a reduced weight container that can immediately respond to internal vacuum created during filling in order to reduce the risk of the container being damaged on the fill line, and that can induce a positive pressure within the container to help fix and prevent denting of the container, would be desirable.

SUMMARY

This section provides a general summary of the disclosure, and is not a comprehensive disclosure of its full scope or all of its features.

The present teachings provide for a blow-molded container including a finish and a base portion. The finish defines an opening at a first end of the container that provides access to an internal volume defined by the container. The base portion includes a diaphragm and a standing surface. The diaphragm extends radially outward from a central push-up portion through which a longitudinal axis of the container extends. The standing surface of the container is at a second end of the container that is opposite to the first end. In response to an internal vacuum caused by hot-filling and closing the container, the diaphragm is configured to move passively from an as-blown first configuration to a second configuration in which the diaphragm is closer to the first end of the container as compared to the as-blown first configuration. The diaphragm is configured to move from the second configuration to an activated third configuration in which the diaphragm is closer to the first end of the container as compared to the second configuration in response to the diaphragm being actuated by an external tool.

The present teachings further provide for a blow-molded container including a finish and a base portion. The finish defines an opening at a first end of the container that provides access to an internal volume defined by the container. The base portion is at a second end of the container that is opposite to the first end. The base portion includes an external standing surface, an upstanding wall, a central push-up portion, a diaphragm, and a hinge. The external standing surface is at an outer diameter of the base portion. The upstanding wall extends from the external standing surface towards the first end of the container and is angled inward away from a sidewall of the container. The central push-up portion is at a center of the container. A longitudinal axis of the container extends through the central push-up portion. The diaphragm extends between the upstanding wall and the central push-up portion. The hinge is where the diaphragm mates with the upstanding wall. In the as-blown first configuration, the diaphragm is a first distance away from the external standing surface. Subsequent to the container being hot-filled, an internal vacuum within the container draws the diaphragm towards the first end of the container to a second configuration. In response to an external actuation force applied to the diaphragm when in the second configuration, the diaphragm moves from the second configuration to an activated third configuration. The diaphragm is closer to the first end of the container in the activated third configuration as compared to the first configuration.

The present teachings further provide for a method for filling a blow-molded container. The method includes hot-filling the container through an opening defining a finish at a first end of the container such that a base portion at a second end of the container passively moves from an as-blown first configuration to a second configuration in response to internal vacuum forces of the container. A diaphragm of the base portion is closer to the first end of the container in the second configuration than the as-blown first configuration. The diaphragm further includes applying external force to the base portion when the base portion is in the second configuration to move the base portion from the second configuration to an activated third configuration in which the base portion is closer to the first end of the container as compared to the second configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3C is a cross-sectional view of the base portion of the container of FIG. 1 at a mid-point of activation, and FIG. 3C illustrates external actuation tooling configured to move the base inward to a full positive displacement position (activated position);

Corresponding reference numerals indicate corresponding parts throughout the several views of the drawings.

DETAILED DESCRIPTION

Example embodiments will now be described more fully with reference to the accompanying drawings.

Illustrated throughout the Figures are exemplary blow-molded containers 10, 110, 210, 310, 410, 510, and 610 according to the present teachings. The containers can be any suitable shape and size, such as 20 ounces for example. The containers can be made of any suitable material, such as any suitable blow-molded thermoplastic or bio-resin, including polyethylene terephthalate (PET), high density or low density polyethylene (HDPE, LDPE), polypropylene (PP), polyethylene naphthalate (PEN), a PET/PEN blend or copolymer, and the like, for example. The containers can be formed in any suitable manner, such as by stretch blow-molding.

The containers each include a lightweight container base portion 40, 140, 240, 340, 440, 540, and 640 for use with hot-fill product applications, such as juice, teas, enhanced water, and the like. As described herein, each of the base portions 40, 140, 240, 340, 440, 540, and 640 use at least two modes of operation to control vacuum and pressure within the filled container. A first mode provides for passive movement of the base under the forces of internal vacuum caused by the hot-fill process and subsequent cooling. A second mode is an active mode that includes application of external force to permanently form a base geometry into the container displacing internal volume to reduce or completely eliminate residual vacuum. Positive pressure in the container may also be achieved to help prevent and fix denting.

Figures 1, 2:
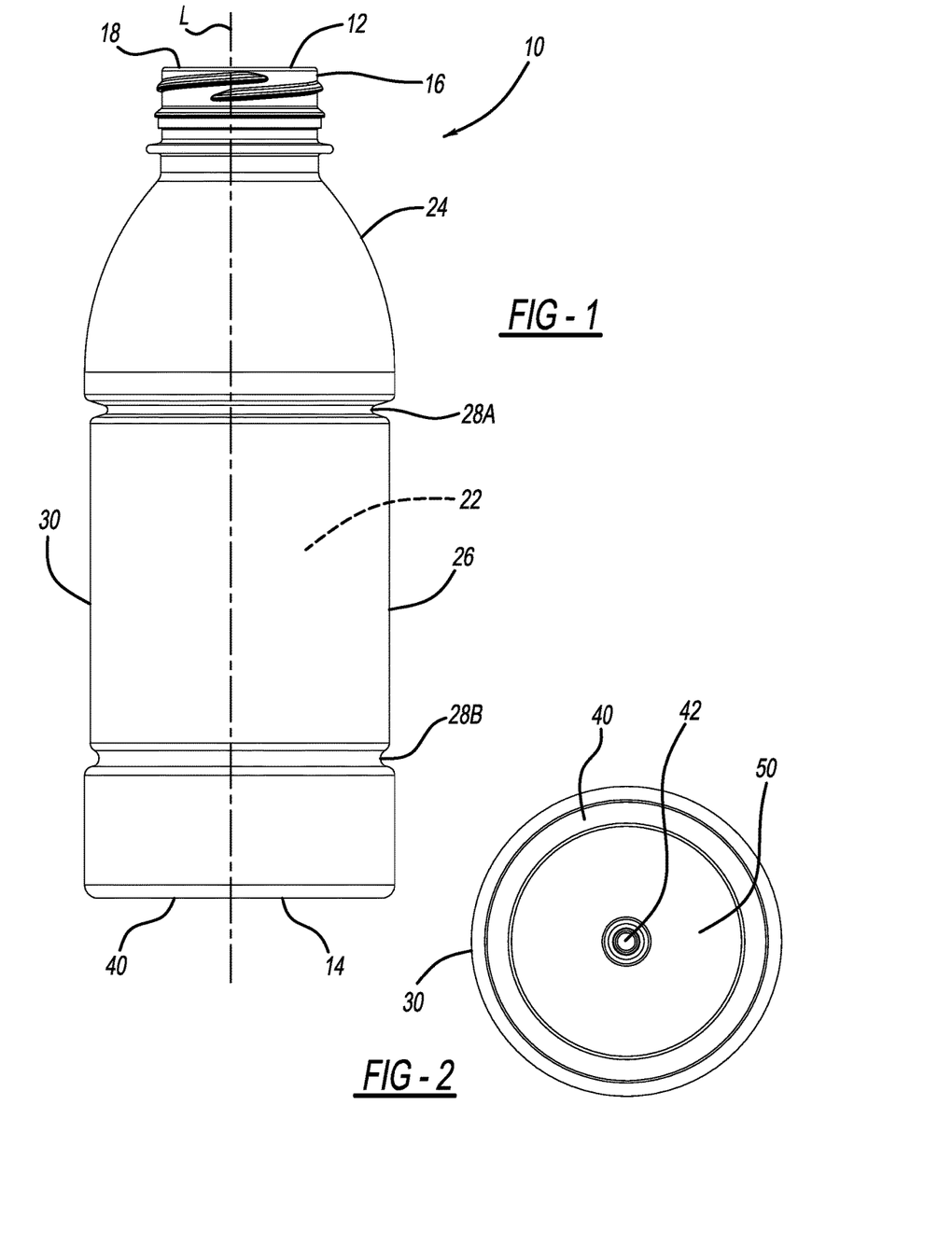
FIG. 1 is a side view of a container according to the present teachings.
FIG. 2 is a plan view of a base portion of the container of FIG. 2.

With initial reference to FIGS. 1 and 2, the present teachings provide for a container 10 including a first end 12 and a second end 14, which is opposite to the first end 12. At the first end 12 is a finish 16 defining an aperture 18, which provides access to an internal volume 22 of the container 10. The internal volume 22 of the container 10 is at least partially defined by a shoulder portion 24 and a body portion 26. One or more ribs 28A and 28B can be defined by a sidewall 30 of the container 10.

Figure 3A:
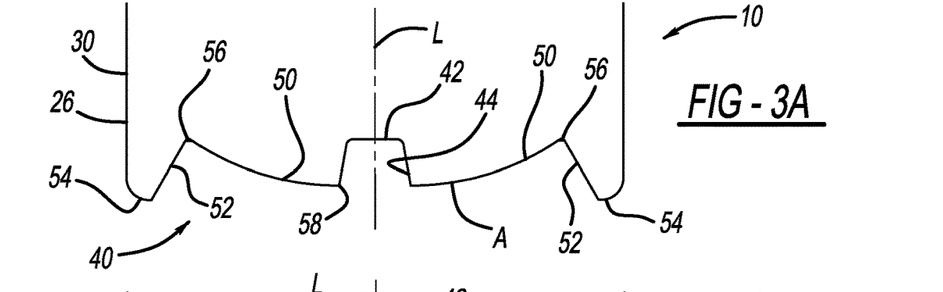
FIG. 3A is a cross-sectional view of the base portion of the container of FIG. 1 in an as-blown configuration.
Figure 3B:
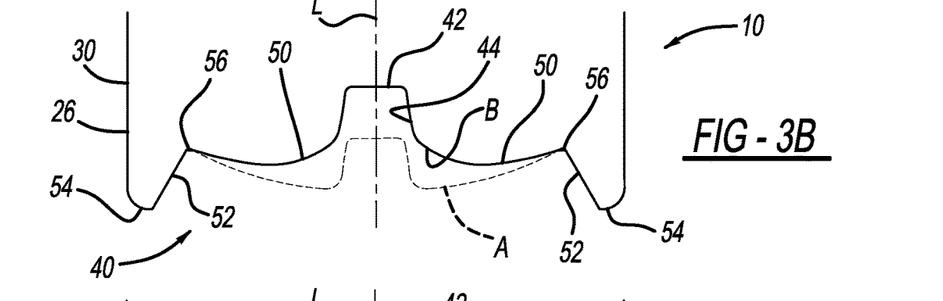
FIG. 3B is a cross-sectional view of the base portion of the container of FIG. 1 under internal vacuum force.

With continued reference to FIGS. 1 and 2, and additional reference to FIGS. 3A and 3B, at the second end 14 is a base portion 40. The base portion 40 includes a central push-up portion (also referred to as a center isolation post) 42, which can be at an axial center of the base portion 40. A longitudinal axis L of the container 10 can extend through a center of the push-up portion 42. The base portion 40 can be formed using a counter-stretch rod that is of a standard length or shorter, and over-stroke can be used to advantageously reduce weight of the base portion 40.

With particular reference to FIGS. 3A and 3B, the push-up portion 42 includes an angled portion (also referred to as an interfacial angled portion) 44, which extends to a diaphragm (also referred to as an inversion ring/radius) 50 of the base portion 40. The diaphragm 50 extends from the central push-up portion 42 to an upstanding wall (also referred to as a primary hemisphere wall) 52. The upstanding wall 52 extends from the diaphragm 50 to a standing surface 54 of the container 10. The base portion 40 generally provides a hinge (also referred to as a transitional radius) 56 where the upstanding wall 52 and the diaphragm 50 meet. An isolation radius 58 is where the diaphragm 50 and the angled portion 44 meet.

FIG. 3A illustrates the base portion 40 in an as-blown first configuration A. In this first configuration A the diaphragm 50 is curved and is generally convex relative to an exterior of the container 10, such as convex relative to the external standing surface 54 of the container 10. The upstanding wall 52 is angled away from the sidewall 30 towards the longitudinal axis L. The upstanding wall 52 can be at any suitable angle, such as about 30°. For example, the upstanding wall 52 can be angled towards the longitudinal axis L from about 15° to about 45°. Thus, the upstanding wall 52 can be angled greater than 20° relative to the longitudinal axis L. The upstanding wall 52 is also less than about 0.34 inches tall as measured from the standing surface 54.

After the container 10 is hot-filled and allowed to cool, an internal vacuum within the container 10 will passively draw the base portion 40 inward towards the first end 12 and to the second configuration B illustrated in FIG. 3B. Specifically, the central push-up portion 42 is drawn along the longitudinal axis L towards the first end 12. The diaphragm 50 also moves towards the first end 12. The diaphragm 50 moves most at the portion thereof proximate to the push-up portion 42. At the hinge portion 56, the diaphragm 50 moves the least, or not at all. A curve radius of the diaphragm 50 is reduced or becomes smaller, and an angle between the upstanding wall 52 and the sidewall 30 generally remains constant as the diaphragm 50 moves from the as-blown first configuration A to the second configuration B. This passive movement of the base portion 40 from the first configuration A of FIG. 3A to the second configuration B of FIG. 3B allows the base portion 40 to respond to the internal vacuum immediately after filling, capping, and cooling (typically in a water spray cooling tunnel), thereby reducing risk of damage to the container 10 as it contacts other containers and tooling on the fill line conveyor.

Figure 3C:
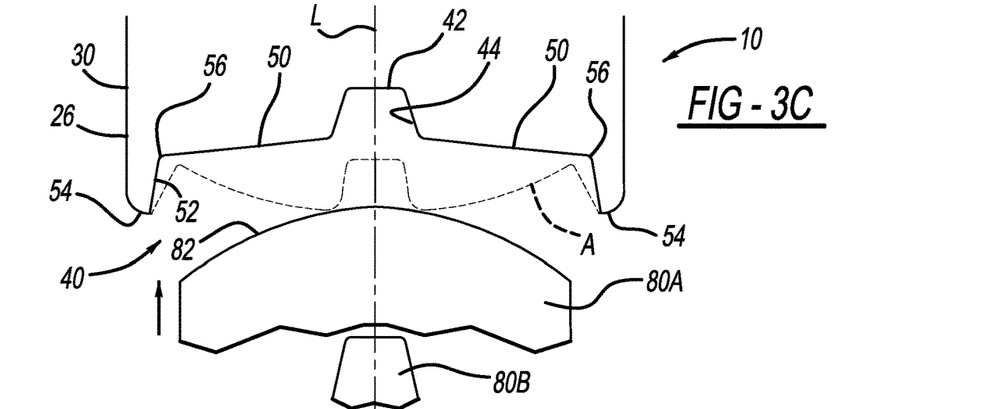

With reference to FIG. 3C, external force is applied to the base portion 40 to move the base portion 40 from the second configuration B to the activated third configuration C. This can be done at any time after filling and capping, or after the container 10 has cooled. The external force can be applied in any suitable manner. For example, a tool 80A including a curved surface 82 that generally matches curvature of the diaphragm 50 in the activated third configuration C can be used. A tool 80B can also be used, which is sized and shaped to be received within the central push-up portion 42 in order to apply the external force at the central push-up portion 42.

As the base portion 40 is forced from the second configuration B to the third configuration C, the central push-up portion 42 and the diaphragm 50 are pushed further towards the first end 12. The diaphragm 50 pivots at the hinge portion 56. The curve radius of the diaphragm 50 may be reduced and the diaphragm 50 may temporarily distort or straighten, as illustrated in FIG. 3C, as the radius of the diaphragm 50 reverses from positive to negative. The change in the curve radius of diaphragm 50 may be either uniform or variable about the circumference of the diaphragm. The upstanding wall 52 is forced towards the sidewall 30 to decrease the angle between the upstanding wall 52 and the sidewall 30.

Figure 3D:
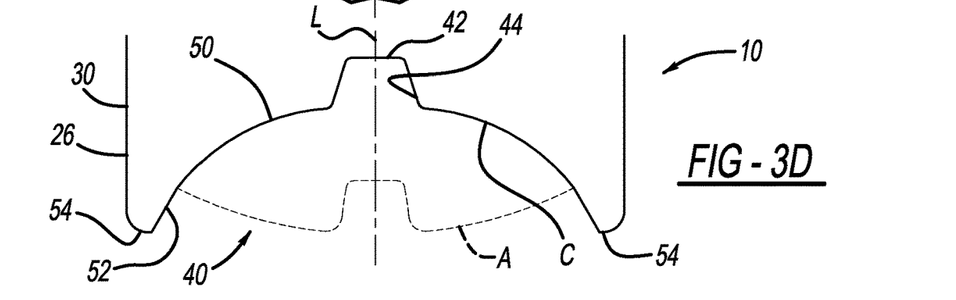
FIG. 3D is a cross-sectional view of the base portion of the container of FIG. 1 in the full positive displacement position (activated position)

As additional force is applied to the diaphragm 50, its position is reversed such that, as illustrated in FIG. 3D, the diaphragm 50 is concave relative to external standing surface 54 of the container 10, and more particularly to a plane extending across the standing surface 54. Furthermore, the upstanding wall 52 will pivot back towards the longitudinal axis L and the angle between the upstanding wall 52 and the sidewall 30 will increase back to, or about to, the original angle between the upstanding wall 52 and the sidewall 30 of the first configuration A. Force of the angle of the upstanding wall 52 acts upon the inverted diaphragm 50 to hold the diaphragm 50 in the position of the activated third configuration C and prevent the diaphragm 50 from returning to the second configuration B or the first configuration A. In addition to or in place of the concave and convex configuration of the diaphragm 50 described above, the diaphragm 50 can be provided with a generally straight or "S-shaped" cross-section.

By forcing the base portion 40 to the activated third configuration C and into the internal volume 22 of the container 10, any remaining internal vacuum will be eliminated or nearly eliminated. Positive pressure may also be induced into the container 10 to help prevent and fix denting of the container 10. Such a positive pressure state in the container 10 allows for a lighter weight and thinner sidewall 30 that performs as good as, or better than, heavier containers with residual internal vacuum. The base portion 40 is formed using over-stroke, which leads to a base portion 40 with a lighter weight as compared to prior containers, uniform material distribution, and a reduced thickness of the sidewall 30. A clearance is provided between the standing surface 54 and the rest of the base portion 40 to prevent roll-out past the standing surface 54.

Figure 4A:
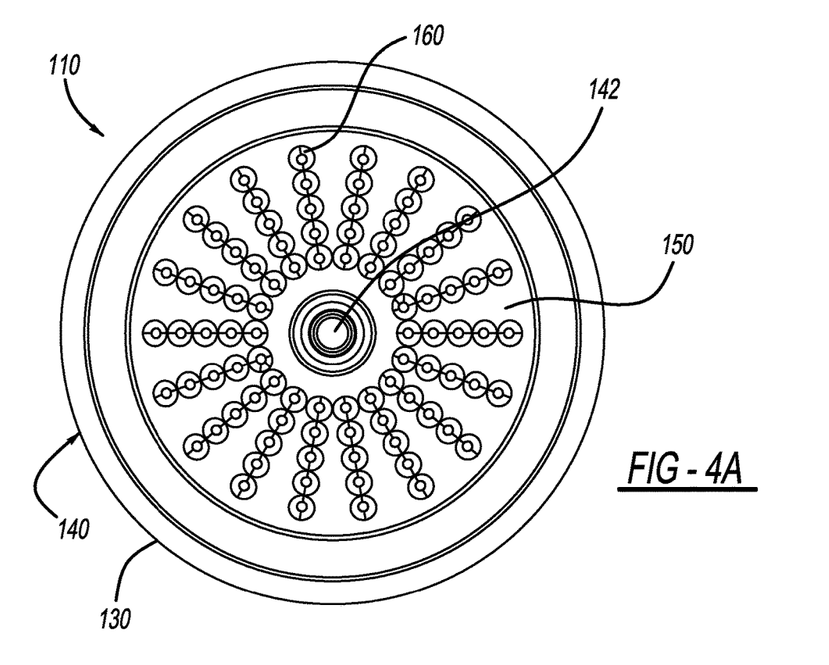
FIG. 4A is a plan view of a base portion of another container according to the present teachings.
Figure 4B:
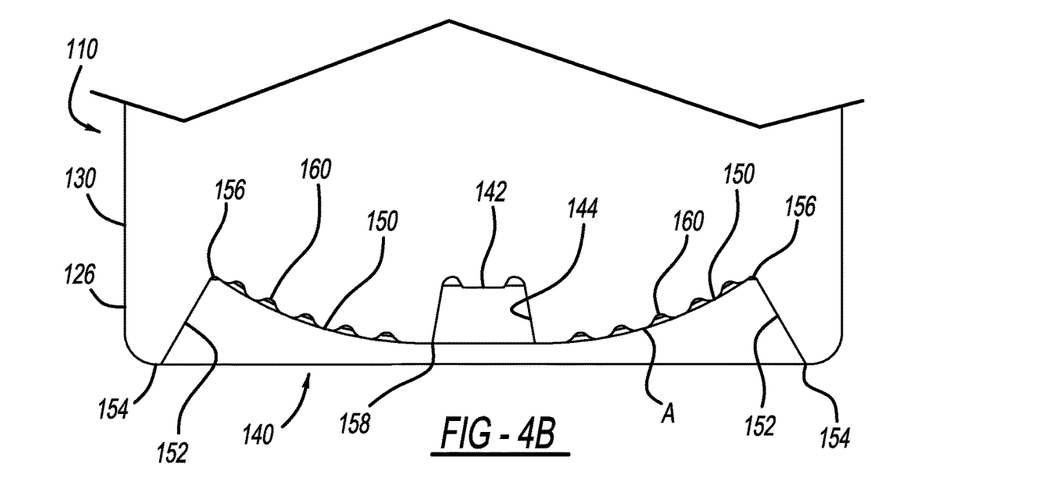
FIG. 4B is a cross-sectional view of the base portion of the container of FIG. 4A.

FIGS. 4A and 4B illustrate another container according to the present teachings at reference numeral 110 in the as-blown first configuration A. The container 110 is substantially the same as the container 10. Therefore, features in common between the container 110 and the container 10 are illustrated using the same reference numbers, but increased by 100. The description the container 10 also applies to the container 110, at least with respect to the common features. Unlike the container 10, the container 110 includes dimples 160 formed in the diaphragm 150, such as to provide the diaphragm 150 with additional strength. Although the dimples 160 are illustrated as round recesses within the diaphragm 150, the dimples 160 can have any other suitable size, configuration, and shape.

Figure 5A:
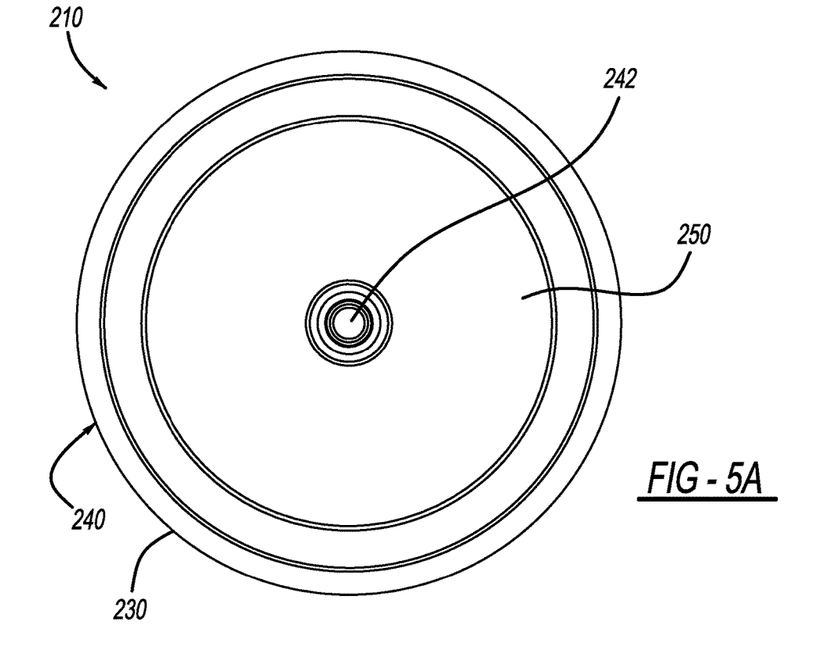
FIG. 5A is a plan view of a base portion of an additional container according to the present teachings.
Figure 5B:
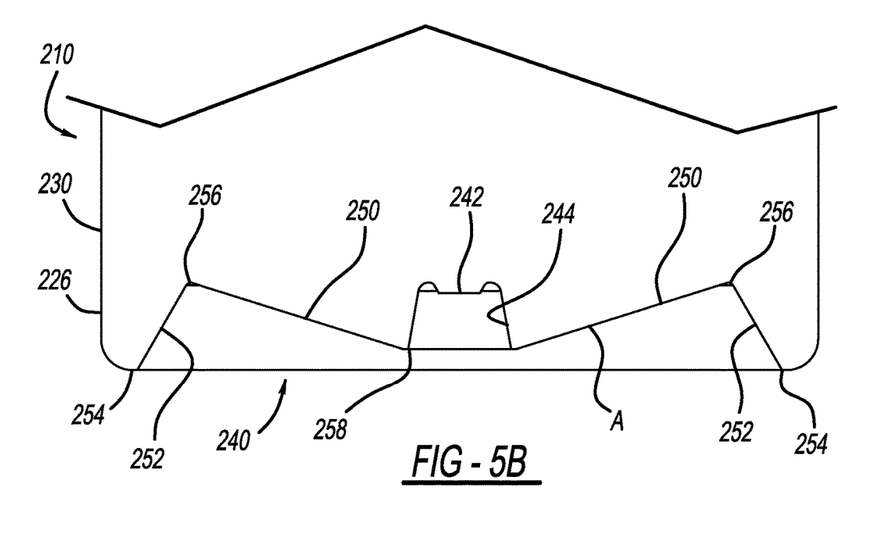
FIG. 5B is a cross-sectional view of the base portion of the container of FIG. 5A.

FIGS. 5A and 5B illustrate an additional container according to the present teachings at reference numeral 210 in the as-blown first configuration A. The container 210 is substantially the same as the container 10. Therefore, features in common between the container 210 and the container 10 are illustrated using the same reference numbers, but increased by 200. The description the container 10 also applies to the container 210, at least with respect to the common features. Unlike the container 10, the container 210 includes a diaphragm 250 that is at least substantially straight or linear between the hinge 256 and the central push-up portion 242.

Thus, from the central push-up portion 242 the diaphragm 250 extends linearly upward to the hinge 256 and generally away from the standing surface 254.

Figure 6A:
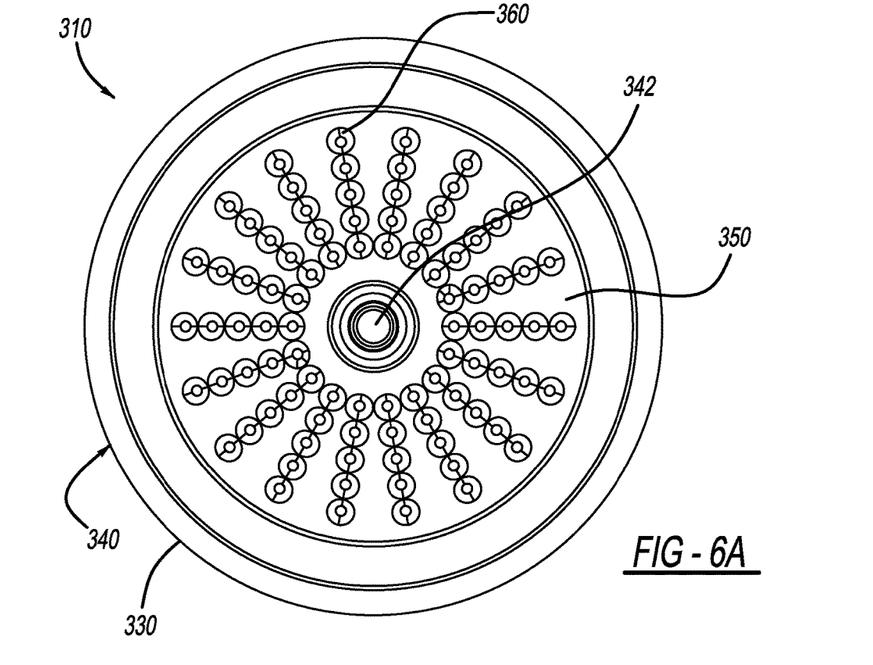
FIG. 6A is a plan view of a base portion of yet another container according to the present teachings.
Figure 6B:
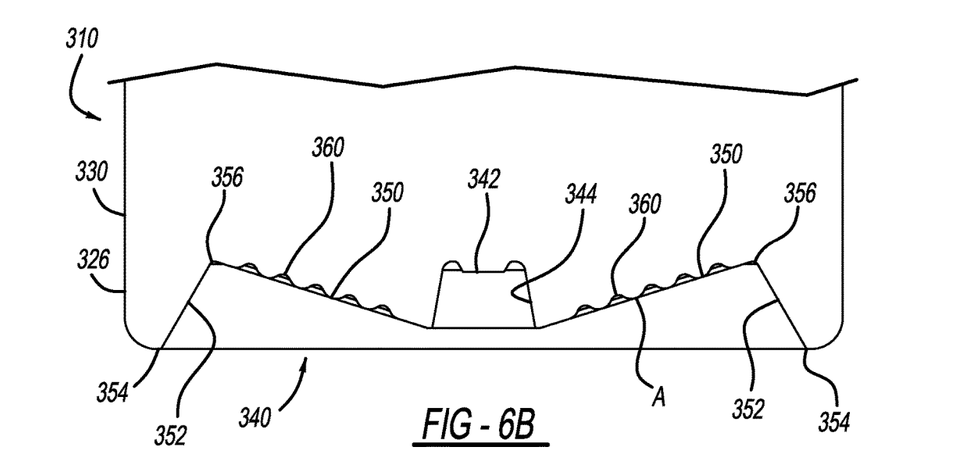
FIG. 6B is a cross-sectional view of the base portion of the container of FIG. 6A.

FIGS. 6A and 6B illustrate an additional container according to the present teachings at reference numeral 310 in the as-blown first configuration A. The container 310 is substantially the same as the container 10. Therefore, features in common between the container 310 and the container 10 are illustrated using the same reference numbers, but increased by 300. The description the container 10 also applies to the container 310, at least with respect to the common features. Unlike the container 10, the container 310 includes a diaphragm 350 that is at least substantially straight or linear between the hinge 356 and the central push-up portion 342. Thus, from the central push-up portion 342 the diaphragm 350 extends linearly upward to the hinge 356 and generally away from the standing surface 354. The container 310 is therefore substantially similar to the container 210, but includes dimples 360 formed in diaphragm 350, such as to provide the diaphragm 350 with additional strength. Although the dimples 360 are illustrated as round recesses within the diaphragm 350, the dimples 360 can have any other suitable size, configuration, and shape.

Figure 7A:
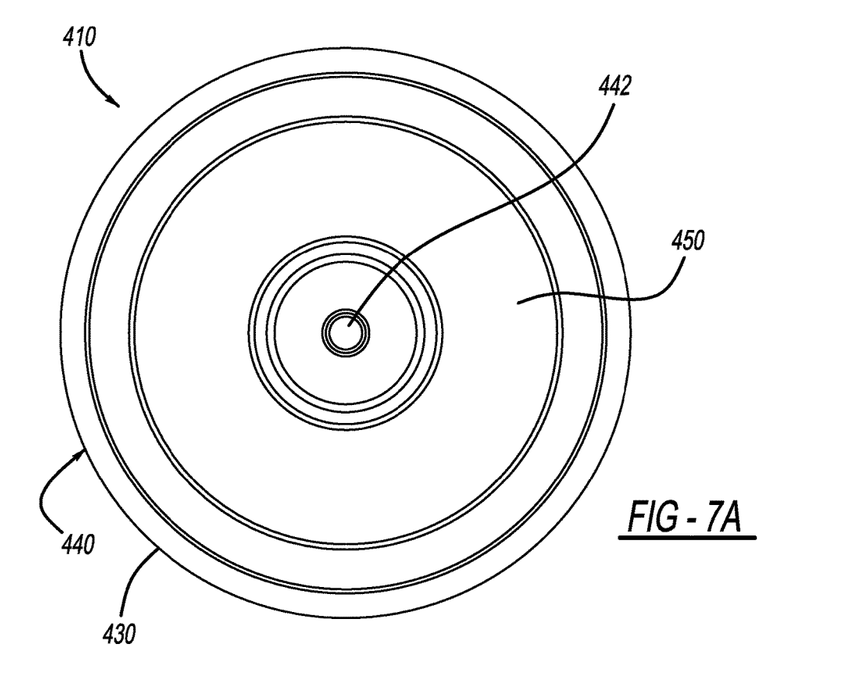
FIG. 7A is a plan view of a base portion of a further container according to the present teachings.
Figure 7B:
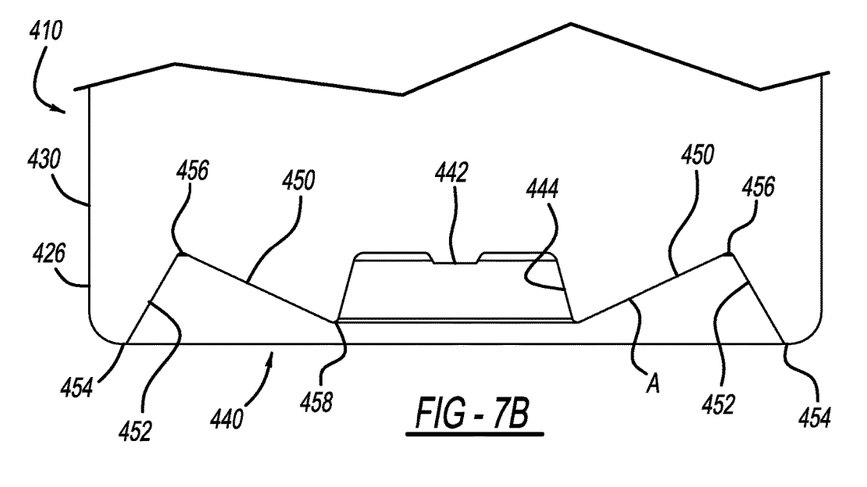
FIG. 7B is a cross-sectional view of the base portion of the container of FIG. 7A.
Figure 8A:
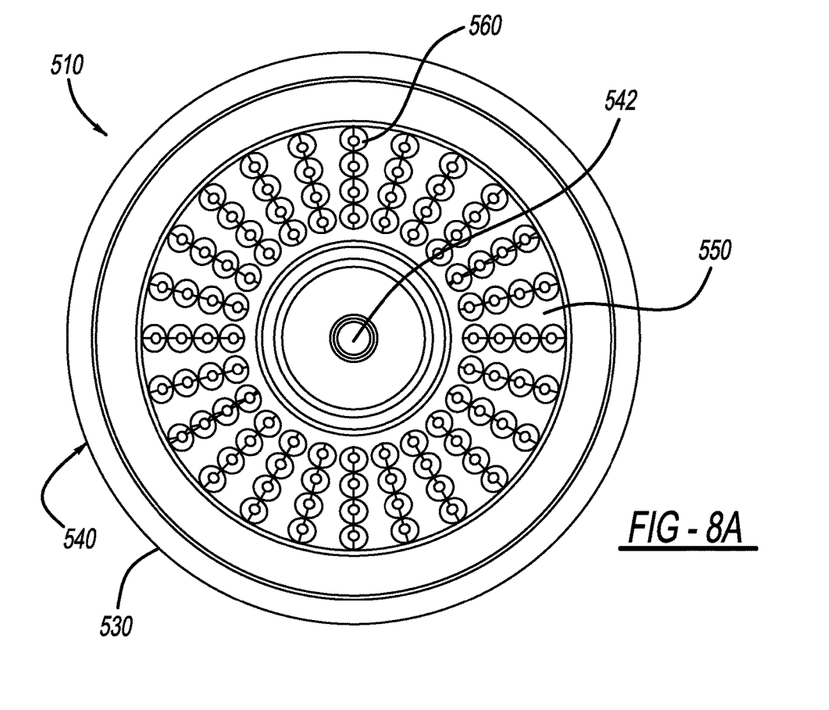
FIG. 8A is a plan view of a base portion of yet an additional container according to the present teachings.
Figure 8B:
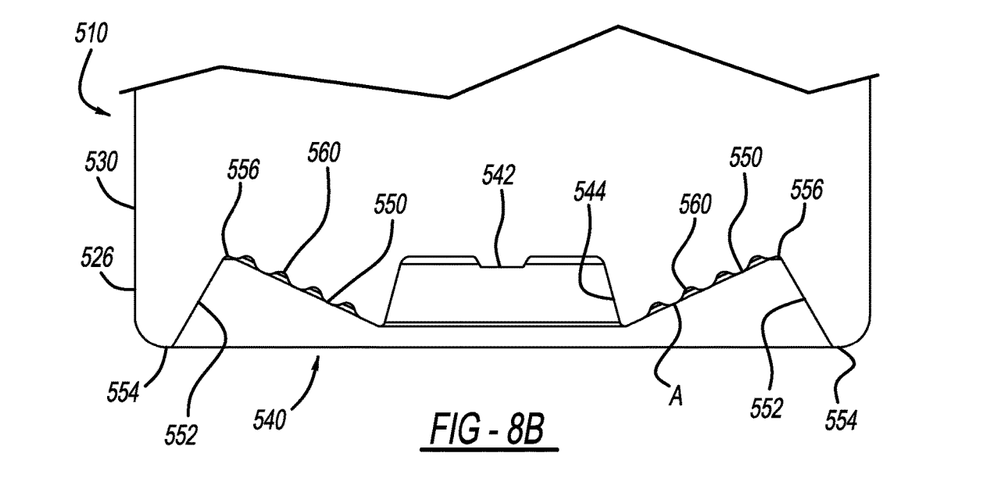
FIG. 8B is a cross-sectional view of the base portion of the container of FIG. 8A.

FIGS. 7A and 7B illustrate an additional container according to the present teachings at reference numeral 410 in the as-blown first configuration A. The container 410 is substantially the same as the container 10. Therefore, features in common between the container 410 and the container 10 are illustrated using the same reference numbers, but increased by 400. The description the container 10 also applies to the container 410, at least with respect to the common features. Unlike the container 10, the container 410 includes a central push-up portion 442 with a radius that is enlarged as compared to the radius of the central push-up portion 42. Furthermore, the container 410 includes a diaphragm 450 that is at least substantially straight or linear between the hinge 456 and the central push-up portion 442. Thus, from the central push-up portion 442 the diaphragm 450 extends linearly upward to the hinge 456 and generally away from the standing surface 454. FIGS. 8A and 8B illustrate container 510 in the as-blown first configuration A, which is substantially the same as the container 410, but includes dimples 560 formed in diaphragm 550, such as to provide the diaphragm 550 with additional strength. Although the dimples 560 are illustrated as round recesses within the diaphragm 550, the dimples 560 can have any other suitable size, configuration, and shape.

Figure 9A:
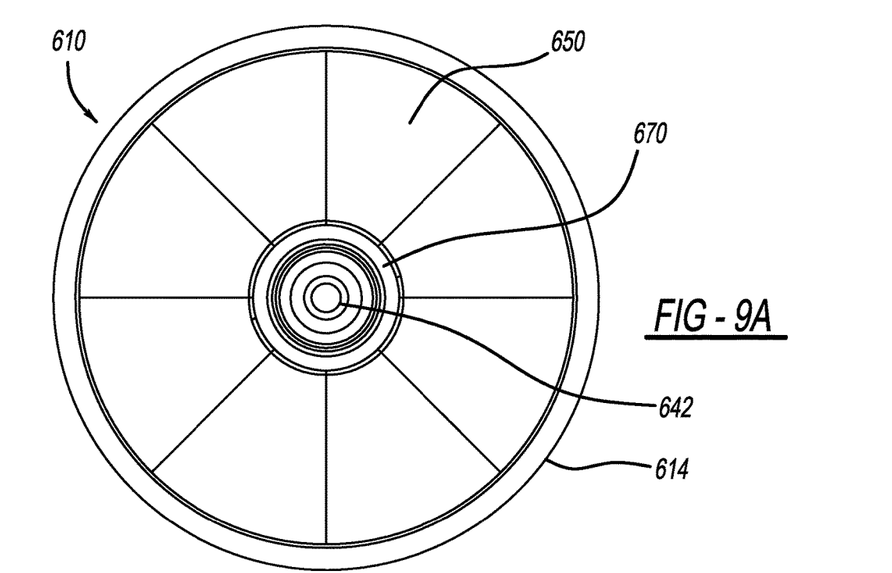
FIG. 9A is a plan view of a base portion of still another container according to the present teachings.
Figure 9B:
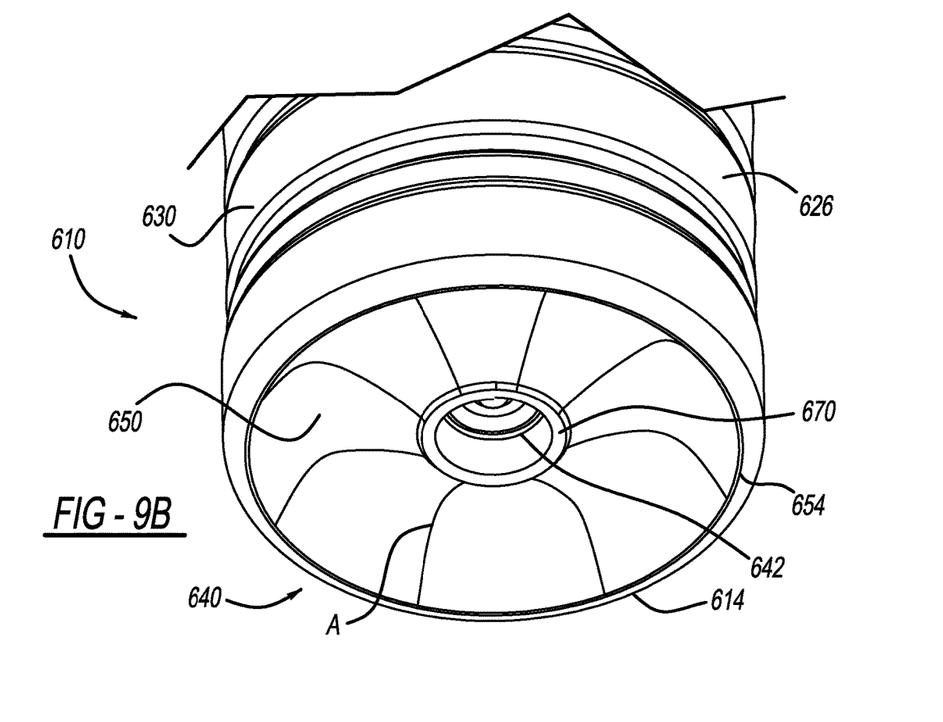
FIG. 9B is a perspective view of the base portion of the container of FIG. 9A.
Figure 9C:
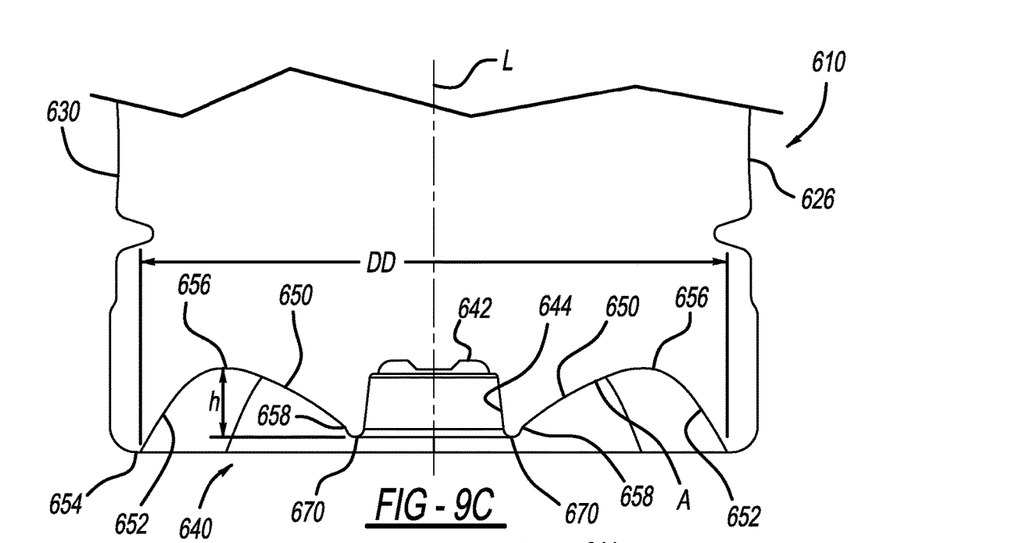
FIG. 9C is a cross-sectional view of the base portion of the container of FIGS. 9A and 9B.
Figure 10A:
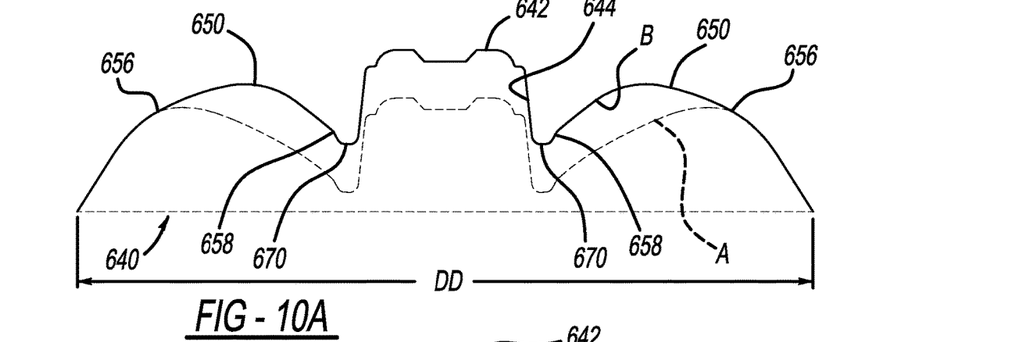
FIG. 10A is a cross-sectional view of the base portion of the container of FIGS. 9A-9C showing the container in an as-blown configuration (phantom) and under internal vacuum force (solid lines)

With reference to FIGS. 9A-9B, another container according to the present teachings is illustrated at reference numeral 610 in the as-blown first configuration A. The container 610 is substantially similar to the container 10. Therefore, features in common between the container 610 and the 10 are illustrated using the same reference numbers, but increased by 600. The description of the container 10 also applies to the container 610, at least with respect to the common features. Unlike the container 10, the container 610 includes a diaphragm or inversion ring/radius 650 that is concave relative to the standing surface 654 and an exterior of the base portion 40 when the base portion 40 is in the as-blown position A of FIGS. 9B, 9C, and 10A (in phantom), for example. The diaphragm or inversion ring/radius 650 is thus without any flat portions or convex portions, which advantageously provides the base portion 640 with a greater ability to absorb internal vacuum prior to the base portion 640 being mechanically inverted to position C of FIG. 10B by any suitable inversion tool, such as tools 80A or 80B of FIG. 3C. Furthermore, unlike the container 10, the primary hemisphere wall 652 of the container 610 has a radius, and is not a linear upstanding wall.

Figure 10B:
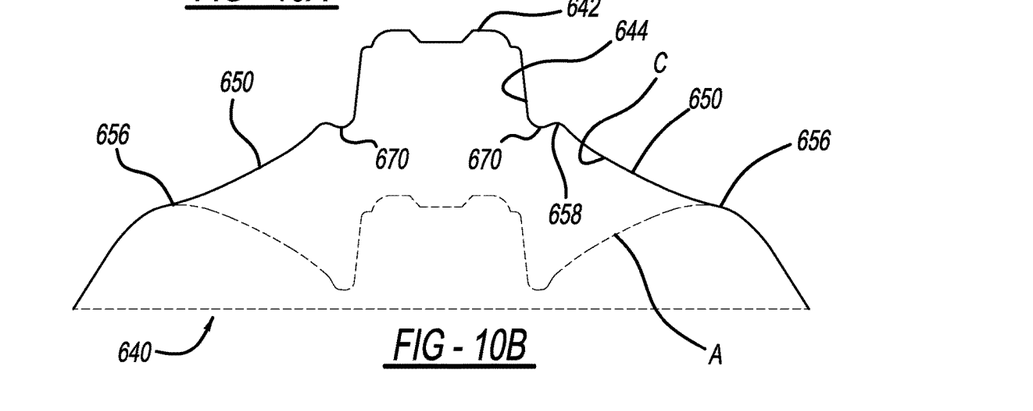
FIG. 10B is a cross-sectional view of the base portion of the container of FIGS. 9A-9C showing the container in an as-blown configuration (phantom) and a full positive displacement position (activated position)

The base portion 640 further includes an isolation rib 670. The isolation rib 670 is located at the isolation radius 658 and circumscribes the central push-up portion 42. The isolation rib 670 protrudes outward and allows the geometry of the base portion 640 to flex and absorb internal vacuum prior to the base portion 640 being mechanically inverted to the activated position C of FIG. 10B. As illustrated in FIG. 10B, the as-blown concave diaphragm or inversion ring/radius 650 at position A transitions to being at least partially convex in activated position C between the transitional radius hinge 656 and the isolation rib 670. This convex configuration in the activated position C helps to prevent the base portion 640 from reverting to position B or position A.

The base portion 640 includes an inversion height "h" (FIG. 9C) between the standing surface 654 and a peak of the inversion radius/ring 650 (such as at the transitional radius hinge 656). The inversion height h controls the amount of vacuum absorbed by the base portion 640. The inversion height h of the base portion 640 is relatively lower than inversion heights of other containers, such as the containers 10, 110, 210, 310, 410, and 510. The relatively short inversion height h of the base portion 640 allows the base portion 640 to absorb more vacuum when moving from position A to position B, and prior to the base portion 640 being mechanically inverted to position C of FIG. 10B by any suitable inversion tool, such as tools 80A or 80B.

Figure 11:
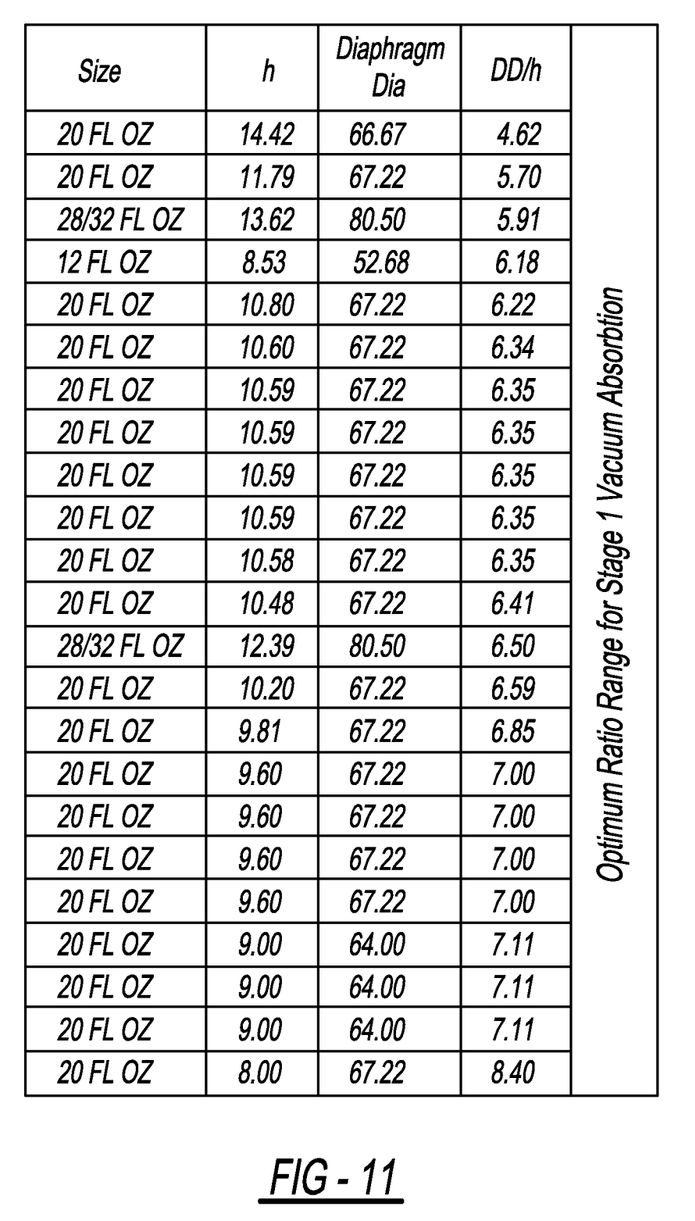
FIG. 11 is a chart of exemplary diaphragm diameter (DD) to base inversion height (h) ratios for different containers according to the present teachings.

The inversion height h can be any suitable height, and can depend on the diameter DD (see FIGS. 9C and 10A for example) of the diaphragm 650 and the overall size of the container 610. For example, if the container 610 is a 20 oz container and the diameter DD of the diaphragm 650 is 64 mm, the height h can be 9 mm. If the container 610 is a 20 oz container and the diameter DD of the diaphragm 650 is 67.22 mm, the height h can range from 8 mm to 11.79 mm. If the container 610 is a 20 oz container and the diameter DD of the diaphragm 650 is 66.67 mm, the height h can be 14.42 mm. If the container 610 is a 28 oz or 32 oz container and the diameter DD of the diaphragm 650 is 80.5 mm, the height h can be 12.39 mm or 13.62 mm. The container 610 can be a 12 oz container and the diameter DD of the diaphragm 650 can be 52.68 mm. As the diaphragm diameter (DD)/height (h) ratio is increased, the vacuum absorption capability of the base 640 is advantageously increased. An exemplary diaphragm diameter (DD)/height (h) ratio is greater than about 6:1. FIG. 11 illustrates exemplary diaphragm diameter (DD)/height (h) ratios for various containers according to the present teachings.

The vacuum absorption of the base 640 (or any other suitable base) is the ease in which the diaphragm 650 is able to move to absorb initial vacuum as the diaphragm 650 moves from the first configuration A to the second configuration B, and thus prior to being subject to mechanical activation to move the diaphragm to the third configuration C. As the height h increases, the radius of the transitional radius hinge 656 typically decreases. The smaller the radius at 656, the more force (vacuum) that is required to move the base 640 from the first configuration A to the second configuration B, as compared to if the radius at 656 is larger. Therefore, as the height "h" increases, the base 640 will absorb less vacuum initially. As the "h" decreases the radius at 656 increases and the base 640 will move at lower vacuum forces absorbing more vacuum initially. In the second configuration B, when the base 640 is mechanically activated, the smaller height "h" will have a smaller vacuum absorbing capacity overall. For example, at a height h of 11.79 mm, the base 640 can absorb approximately 20.5 ml of volume. At a height h of 9.6 mm, the base 640 can absorb approximately 15.7 ml of volume. The larger the volume that the base 640 ultimately displaces, the lower the final residual vacuum in the container 610. But the initial force required to move the base 640 with the height h of 9.6 mm to relieve the vacuum prior to mechanical activation (mechanically moving the base 640 to configuration C) will be substantially less than the base 640 with the height h of 11.79 mm. Wall thickness of the container base 640 may change based on container size. As wall thickness decreases, the capacity to absorb vacuum increases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blow-molded container comprising:
    a finish defining an opening at a first end of the container that provides access to an internal volume defined by the container; and
    a base portion including:
        a diaphragm extending radially outward from a central push-up portion through which a longitudinal axis of the container extends;
        a standing surface of the container at a second end of the container that is opposite to the first end;
    wherein:
        in response to an internal vacuum caused by hot-filling and closing the container, the diaphragm is configured to move passively from an as-blown first configuration to a second configuration in which the diaphragm is closer to the first end of the container as compared to the as-blown first configuration; and
        the diaphragm is configured to move from the second configuration to an activated third configuration in which the diaphragm is closer to the first end of the container as compared to the second configuration in response to the diaphragm being externally actuated by a tool; and
    an upstanding wall extending from the standing surface towards the first end of the container, the upstanding wall is angled away from a sidewall of the container and towards the central push-up portion;
    wherein at least a portion of the upstanding wall is configured to move towards the sidewall and subsequently away from the sidewall as the base portion moves from the second configuration to the third configuration.

2. The blow-molded container of claim 1, wherein the diaphragm is concave relative to the standing surface of the container in the as-blown first configuration, and the diaphragm is convex relative to the standing surface of the container in the activated third configuration.

3. The blow-molded container of claim 1, wherein the base portion further includes a hinge between the upstanding wall and the diaphragm, at least a portion of the hinge is configured to move towards the sidewall of the container and subsequently away from the sidewall of the container as the base portion moves from the second configuration to the third configuration.

4. The blow-molded container of claim 1, further comprising an isolation rib circumscribing the central push-up portion and protruding outward from the base portion away from the first end of the container.

5. The blow-molded container of claim 1, wherein the container has a ratio of diaphragm diameter to inversion height of the base portion defined between the standing surface and a peak of the diaphragm in the as-blown first configuration of greater than about 6:1.

6. The blow-molded container of claim 1, wherein the diaphragm continuously curves outward away from the longitudinal axis and the central push-up portion in the as-blown first configuration.

7. A blow-molded container comprising:
    a finish defining an opening at a first end of the container that provides access to an internal volume defined by the container; and
    a base portion at a second end of the container opposite to the first end, the base portion including:
        an external standing surface of the container at an outer diameter of the base portion;
        an upstanding wall extending from the external standing surface towards the first end of the container and angled inward away from a sidewall of the container;
        a central push-up portion at a center of the base portion, a longitudinal axis of the container extends through the central push-up portion;
        a diaphragm extending between the upstanding wall and the central push-up portion; and
        a hinge where the diaphragm mates with the upstanding wall;
    wherein:
        subsequent to the container being hot-filled an internal vacuum within the container draws the diaphragm from an as-blown first configuration towards the first end of the container to a second configuration;
        in response to an external actuation force applied to the diaphragm when in the second configuration, the diaphragm moves from the second configuration to an activated third configuration, the diaphragm is closer to the first end of the container in the activated third configuration as compared to the second configuration; and
        the base portion is configured such that the hinge moves towards the sidewall and then away from the sidewall as the base portion is moved from the second configuration to the activated third configuration by the external actuation force.

8. The blow-molded container of claim 7, wherein the diaphragm is concave relative to the external standing surface of the container in the as-blown first configuration, and the diaphragm is at least partially convex relative to the standing surface of the container in the activated third configuration.

9. The blow-molded container of claim 8, wherein the diaphragm is devoid of flat and convex portions in the as-blown first configuration.

10. The blow-molded container of claim 9, wherein the upstanding wall is integrated with the diaphragm.

11. The blow-molded container of claim 7, further comprising an isolation rib circumscribing the central push-up portion and protruding outward from the base portion away from the first end of the container.

12. The blow-molded container of claim 7, wherein the hinge is stationary as the central push-up portion and the diaphragm move towards the first end of the container.

13. The blow-molded container of claim 7, wherein the hinge and the upstanding wall are concave relative to the second end of the container in the as-blown first configuration.

14. The blow-molded container of claim 7, wherein the diaphragm changes shape as the diaphragm moves towards the first end of the container.

15. The blow-molded container of claim 7, wherein the base portion is configured such that the hinge remains stationary as the base portion is moved from the second configuration to the activated third configuration by the external actuation force.

16. The blow-molded container of claim 7, wherein the container has a ratio of diaphragm diameter to inversion height of the base portion defined between the standing surface and a peak of the diaphragm in the as-blown first configuration of greater than about 6:1.

17. The blow-molded container of claim 7, wherein the diaphragm continuously curves outward away from the longitudinal axis and the central push-up portion in the as-blown first configuration.

18. A method for filling a blow-molded container comprising:
    hot-filling the container through an opening defining a finish at a first end of the container such that a base portion at a second end of the container passively moves from an as-blown first configuration to a second configuration in response to internal vacuum forces of the container, a diaphragm of the base portion is closer to the first end of the container in the second configuration than the as-blown first configuration; and
    applying external force to the base portion when the base portion is in the second configuration to move the base portion from the second configuration to an activated third configuration in which the base portion is closer to the first end of the container as compared to the second configuration,
    wherein an upstanding wall of the base portion moves towards and away from a sidewall of the container as the diaphragm moves from the second configuration to the third configuration.

19. The method of claim 18, further comprising forming the blow-molded container to have an isolation rib circumscribing the central push-up portion and protruding outward from the base portion away from the first end of the container.

20. The method of claim 18, wherein the container has a ratio of diaphragm diameter to inversion height of the base portion defined between the standing surface and a peak of the diaphragm in the as-blown first configuration of greater than about 6:1.

21. The method of claim 18, wherein moving the base portion from the second configuration to the third configuration moves the base portion from a convex shape to a concave shape relative to an exterior of the base portion.

22. The method of claim 18, wherein the diaphragm retains a concave shape relative to an exterior of the base portion as the diaphragm moves from the second configuration to the third configuration.

23. The method of claim 18, further comprising forming the blow-molded container such that the diaphragm is: continuously concave relative to an exterior of the base portion, and is devoid of flat or convex portions.

* * * * *